United States Patent [19]
Teders

[11] 3,809,243
[45] May 7, 1974

[54] TURBIDITY MONITOR FOR DIALYSIS MACHINES

[75] Inventor: Philip J. Teders, Ann Arbor, Mich.

[73] Assignee: Sarns, Inc., Ann Arbor, Mich.

[22] Filed: Jan. 26, 1972

[21] Appl. No.: 220,836

[52] U.S. Cl. .................................. 210/96, 210/321
[51] Int. Cl. .......................................... B01d 31/00
[58] Field of Search ................. 210/96, 321; 137/93

[56] References Cited
UNITED STATES PATENTS

| | | | |
|---|---|---|---|
| 3,352,779 | 11/1967 | Austih et al. | 210/96 X |
| 2,299,529 | 10/1942 | Crampton | 210/96 |
| 2,063,140 | 12/1936 | Allison | 210/96 X |
| 3,508,656 | 4/1970 | Serfass et al. | 210/96 X |
| 3,406,826 | 10/1968 | Willock | 210/93 X |

Primary Examiner—Frank A. Spear, Jr.
Attorney, Agent, or Firm—Barnes, Kisselle, Raisch & Choate

[57] ABSTRACT

An improved turbidity monitor for a dialysis machine. The amount of turbidity, or impurity, of dialytic fluid is continuously monitored by a measuring photocell which receives light transmitted from a lamp through a conduit which carries the dialytic fluid. As the fluid turbidity changes, the amount of light received by the photocell also changes. The photocell correspondingly generates an electric signal measurement of fluid turbidity. Light is also shone onto a reference photocell to develop a reference signal which compensates for variations in the output of the measuring photocell caused by aging thereof. As the two photocells age, their operating characteristics change in substantially the same fashion. The two photocells are connected in circuit such that error in the turbidity signal due to aging of the measuring photocell is offset by change in the reference signal due to aging of the reference photocell. The monitor therefore maintains accuracy for an extended period of time. An alarm may be used to indicate when the fluid turbidity exceeds a predetermined level.

2 Claims, 4 Drawing Figures

FIG. 2

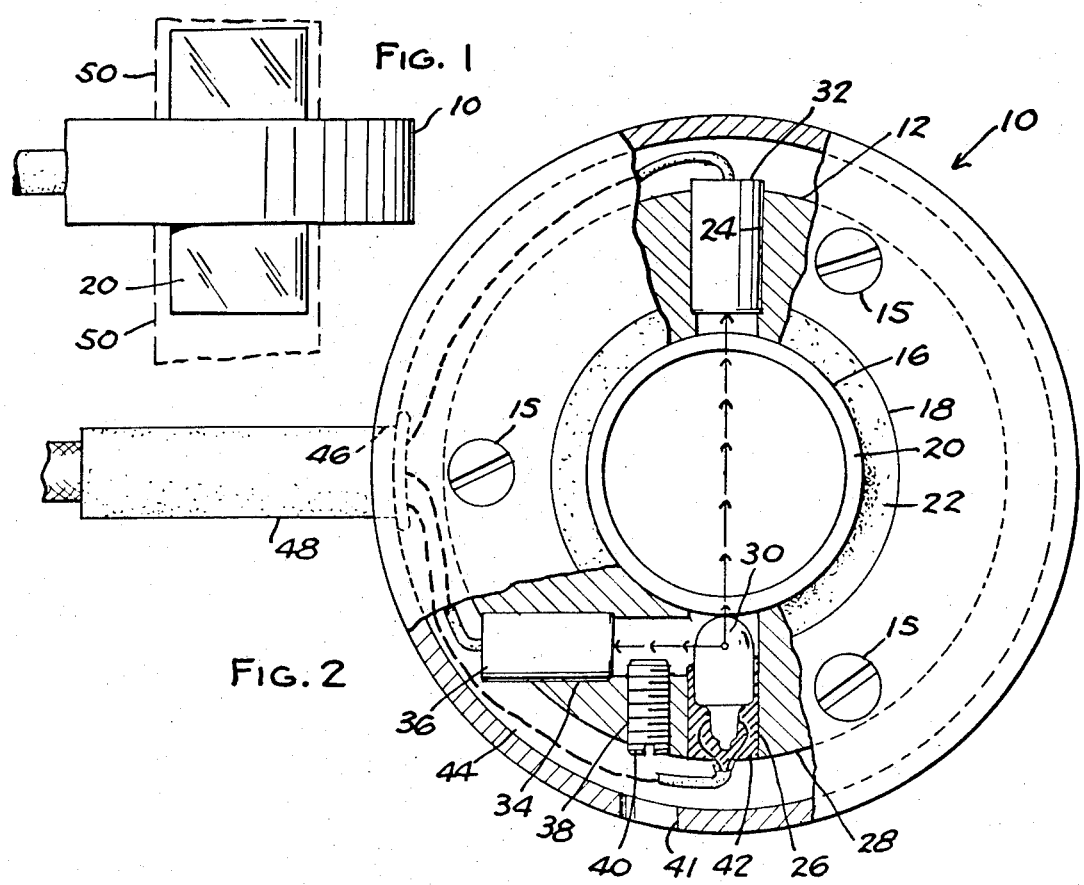
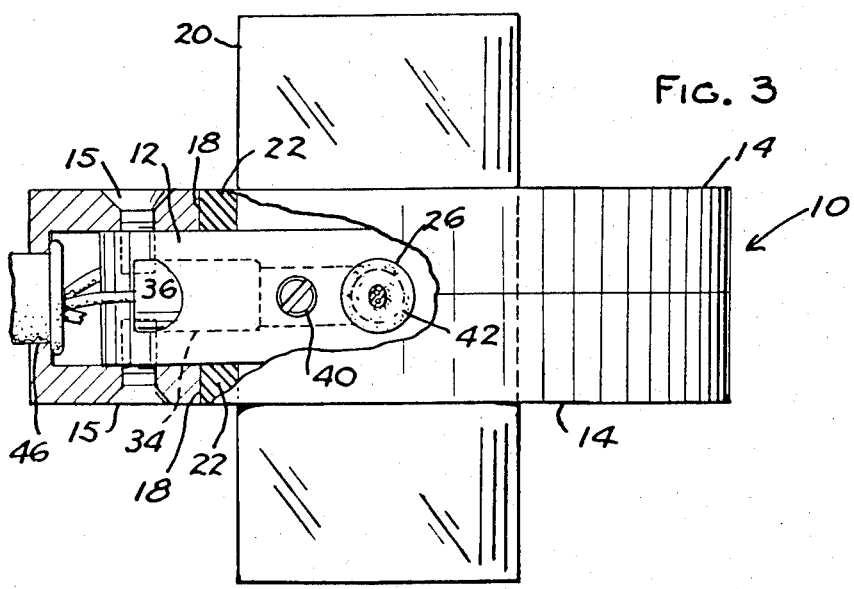

3,809,243

TURBIDITY MONITOR FOR DIALYSIS MACHINES

This invention relates to dialysis equipment and in particular to an improved turbidity monitor and alarm for use with such equipment to indicate when the impurity of the dialytic fluid exceeds a predetermined level.

One type of dialysis machine removes waste products from the blood of a patient by circulating blood and dialytic fluid in separate flow paths across opposite surfaces of a membrane separating the two flow paths. During normal operation, waste products in the blood, whose dimensions are smaller than those of other blood constituents, pass through the membrane into the dialytic fluid which carries them away. The impurity-carrying dialytic fluid is then processed to remove the waste products, and the purified fluid recirculated across the membrane to continue dialysis. A characteristic of the membrane which is critical to the safety of the patient is the capability of the membrane to pass waste products while simultaneously blocking other constituents which are not intended to be removed from the blood. Thus, should the membrane fail in such a way that the larger blood constituents which are not intended to be removed enter the dialytic fluid, a serious problem arises. While a complete rupture of the membrane could be visually seen by the mixing of blood in the dialytic fluid, membrane failure which allows blood constituents whose dimensions are only slightly greater than those of the waste products to pass through is not readily apparent to the eye of an observer, and is therefore especially critical.

In the past, turbidity monitoring apparatus has been used to detect failures of the above-described type. One type of monitor utilizes an electric monitoring circuit comprising an electric photocell which senses the intensity of light transmitted from a lamp through the impurity-carrying dialytic fluid. Because changes in the impurity level of dialytic fluid change the light transmission characteristics thereof, the photocell, by detecting changes in the intensity of light transmitted through the fluid, can detect the presence of impurities which are not readily apparent to the naked eye. A serious disadvantage of such monitoring apparatus is that the operating characteristics of the photocell change as the photocell ages. Even in a monitor which includes lamp compensating means which compensate for variations in the intensity of the light emitted from the lamp, reliability of the apparatus is still limited by the aging of the photocell. Thus, where the apparatus is initially adjusted to detect impurity levels greater than a selected minimum level, the aging photocell changes the overall adjustment of the apparatus. As a result, the apparatus must be checked relatively frequently and readjusted as required.

The primary object of the present invention is to alleviate the aforementioned disadvantage by compensating for aging of the photocell. An important benefit resulting from such compensation is that the monitoring apparatus may be continuously operated for longer periods of time without need of readjustment. Another advantage is that such compensation may be provided concurrently with compensation for variations in the light intensity of the lamp which shines light through the dialytic fluid onto the photocell.

Further objects of the invention include the provision of an adjustable turbidity monitor and alarm: which maintains longer-lasting reliability and accuracy; which can be readily adjusted to respond to any selected impurity level; which may be readily tested to verify proper operation thereof; and which is suitable for use with virtually any type of dialysis equipment.

Additional objects, features and advantages of the invention will be apparent in the following description and claims in which the principles of operation are set forth together with the best mode presently contemplated for the practice of the invention.

In the drawings:

FIG. 1 is a top plan view of the transducer of the present invention.

FIG. 2 is an enlarged front view of FIG. 1 having portions broken away.

FIG. 3 is a bottom view of FIG. 2 having a portion broken away.

Figure 4:
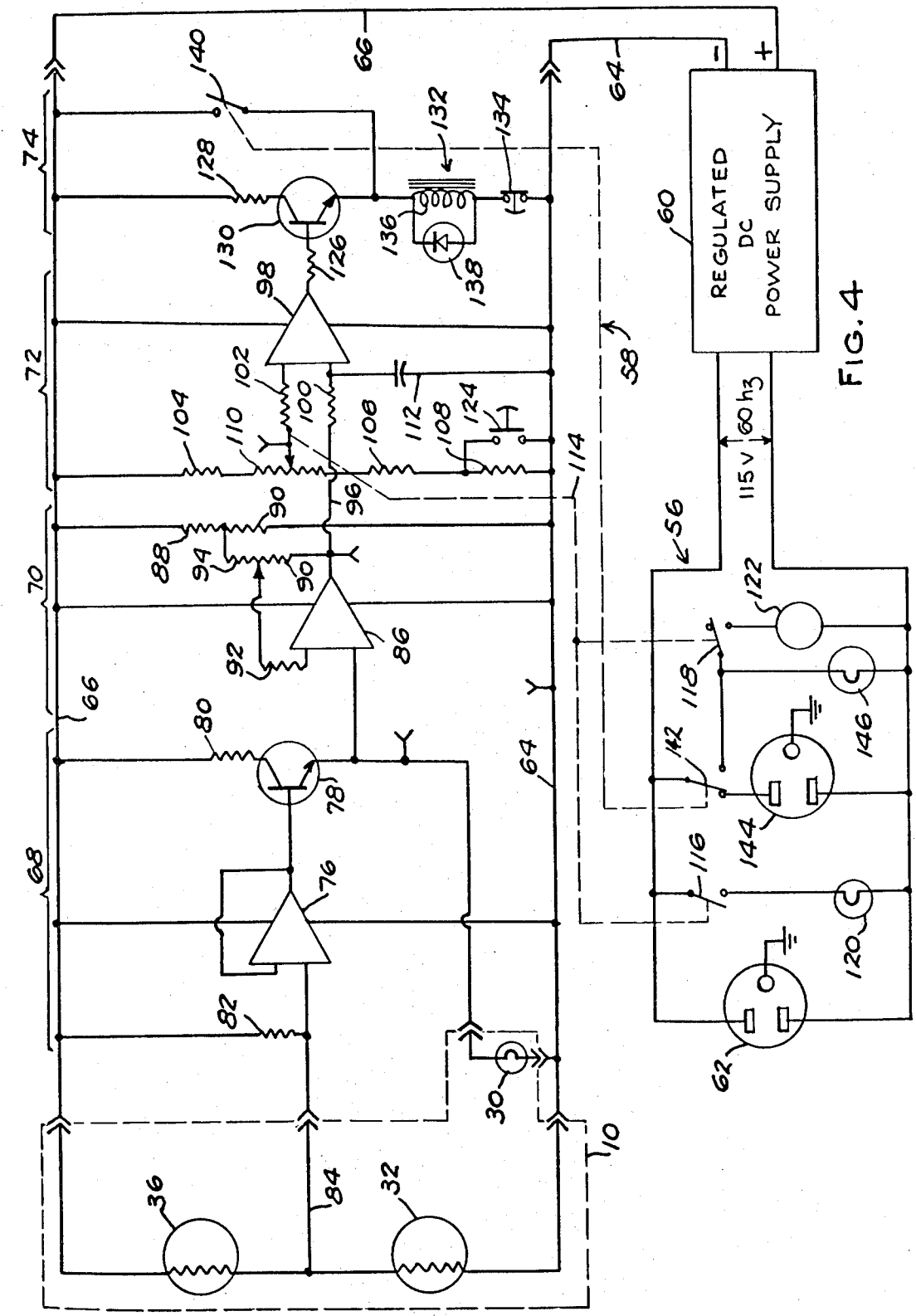
FIG. 4 is an electrical schematic diagram of the adjustable monitor and alarm circuit of the invention.

The turbidity monitor of the present invention may be briefly summarized as comprising a transducer having a light source, a reference photocell, a measuring photocell, and a fluid passage arranged between the light source and the measuring photocell, and an electric circuit which is connected to the transducer and responsive to the outputs of the reference and measuring photocells for developing an accurate measurement of fluid turbidity. Changes in the level of turbidity, or impurity, of fluid within the fluid passage change the light transmission characteristics thereof and hence vary the amount of light falling on the measuring photocell. Accordingly, the output of the measuring photocell corresponds to the fluid turbidity level. As the transducer operates, both photocells age together. Changes in the output characteristics of the measuring photocell which are due to photocell aging are offset by similar changes in the output characteristics of the reference photocell. In this way, the initial accuracy of the turbidity monitor is maintained for relatively long operating times before circuit readjustment and/or replacement of the photocells is required. Therefore, the turbidity monitor continues to develop an accurate output signal measurement of the turbidity of the fluid for a greater length of operating time than in turbidity monitors which use only a single photocell. The turbidity signal measurement may be amplified and compared with an adjustable reference signal for operating an alarm circuit whenever the turbidity signal measurement exceeds the selected reference signal to thereby indicate that the impurity level of the fluid has exceeded the allowable level as established by the selected reference signal. The transducer includes balance adjustment means for initially balancing the outputs of the two photocells at a selected level of fluid turbidity. The balance adjustment means is in the form of aperture adjustment means for adjusting the amount of light incident on the reference photocell.

Turning now to the drawings and in particular to FIGS. 1, 2 and 3, the transducer 10 of the invention comprises a mounting ring 12 housed within a pair of opposed matching circular covers 14 secured to ring 12 by screws 15. Ring 12 has a central circular bore 16 and each cover 14, a larger central bore 18 axially aligned with bore 16. A glass tube 20 for conducting turbid dialytic fluid through transducer 10 extends through the three bores and is retained by compressible mounting rings 22 within bores 18. As seen in FIG. 2, two diametrically opposite passages 24 and 26 extend radially through ring 12 from bore 16 to the outer circumferential ring surface 28. A lamp 30 is mounted in passage 26 to radiate light through tube 20 onto the light-receiving end of a measuring photocell 32 mounted within passage 24. Ring 12 further includes a passage 34 extending from outer surface 28 to intersect passage 26 adjacent the filament of lamp 30. A reference photocell 36 situated within passage 34 receives light from lamp 30. A threaded bore 38 extends from the outer ring surface 28 adjacent passage 26 to intersect passage 34 between photocell 36 and lamp 30. An adjustment screw 40 is threaded into bore 38 and may be extended into passage 34 to progressively reduce the amount of light falling on photocell 36 from lamp 30. Screw 40 is accessible for adjustment via an opening 41 in cover 14 to form an aperture adjustment for regulating the amount of light incident on reference photocell 36. As will be later seen, this aperture adjustment is used to balance the circuit to which transducer 10 is connected. Lamp 30 and photocells 32 and 36 may be mounted by any suitable means, for example, by a resilient mounting such as 42 shown for mounting lamp 30 in passage 26 against vibration. The lead wires from the two photocells 32 and 36 and lamp 30 are brought through the annular free space 44 between ring 12 and covers 14 and out of an opening 46 in covers 14 to form a cable 48 whose other end terminates in a connector plug (not shown) for connecting transducer 10 to the circuit shown in FIG. 4. Transducer 10 thus provides a compact, sturdy unit which is suited for virtually any type of dialysis machine. As shown in FIG. 1, the transducer may be conveniently inserted into a dialytic fluid line 50 so that dialytic fluid is conducted through tube 20.

Turning now to FIG. 4, transducer 10 is schematically illustrated as connected to an electric circuit which generates an alarm signal in response to impurities in dialytic fluid flowing through tube 20 which exceed a predetermined level. As will be subsequently understood in greater detail, the circuit operates by continuously measuring the output of the measuring photocell relative to the output of the reference photocell. The circuit of FIG. 4 comprises an AC circuit portion generally designated 56, a DC portion generally designated 58 and a regulated DC power supply 60. Electric power is supplied to the circuit by connecting a conventional plug 62 into a standard 115v 60hz receptacle. Power supply 60 in turn develops a well-regulated DC voltage which is delivered to DC circuit portion 58 by negative and positive lines 64 and 66 respectively. Because the remaining circuitry of AC portion 56 can be better understood in light of description of the DC portion 58, attention is therefore first directed to this latter portion.

Transducer 10 is plugged directly into a voltage follower stage 68 which forms the input stage of DC circuit 58. Circuit 58 includes successive cascaded stages which are: an amplifier stage 70, a comparator stage 72 and a relay driver stage 74. As can be seen, DC power is conducted via lines 64 and 66 to all stages as well as to transducer 10.

Describing now the individual construction of each stage and considering the input stage 68 in connection with transducer 10, stage 68 comprises an integrated circuit 76, a transistor 78 and resistors 80 and 82 connected as illustrated. The two photocells 32 and 36 of transducer 10 are connected in series across lines 64 and 66 with one terminal of reference photocell 36 being connected to the positive line 66, its other terminal to one terminal of measuring photocell 32 and the other terminal of photocell 32 to negative line 64. The common junction 84 of photocells 32 and 36 is connected as an input to integrated circuit 76. Lamp 30 is connected as a load in the emitter circuit of transistor 78. Screw 40 of transducer 10 is adjusted to balance the two photocells for a base impurity level (for example, zero turbidity, or pure, dialytic fluid), by making the total light incident on reference photocell 36 equal to the total light incident on measuring photocell 32 after passing through tube 20 and the fluid. With this balance, the outputs of the two photocells 32 and 36 are equal and hence the DC voltage between lines 64 and 66 divides equally across each photocell. Integrated circuit 76 in turn develops a signal level at the base terminal of transistor 78 corresponding to the balanced condition of the two photocells. This signal level represents the base impurity level of dialytic fluid. Now, as the impurity level of dialytic fluid increases from the base impurity level, the amount of light incident on measuring photocell 32 decreases. However, the amount of light on reference photocell 36 remains unchanged and consequently the two photocells go out of balance. This imbalance is reflected as a change in the voltage at junction 84 and the amount of voltage change is related to the amount of photocell imbalance. The net result is that the signal developed at the base of transistor 78 by integrated circuit 76 varies in accordance with the impurity level of the dialytic fluid. The load in the collector-emitter circuit of transistor 78 (i.e., resistor 80 and lamp 30) biases transistor 78 for operation in its linear region. Therefore, as the base signal varies, the emitter voltage of transistor 78 also varies. As can now be understood, changes in the emitter voltage represent changes in the turbidity of the dialytic fluid. Therefore, the emitter voltage becomes the turbidity output signal of stage 68. The circuit components are selected so that changes in the emitter voltage over the turbidity range which is to be monitored are relatively small and do not substantially change the intensity of light from lamp 30. As will be later seen, the circuit is substantially insensitive to changes in the intensity of light from lamp 30 and thus, such changes have an insignificant effect on the circuit operation.

Amplifier stage 70 comprises an integrated circuit 86, resistors 88, 90 and 92 and potentiometer 94 connected as illustrated to amplify the turbidity output signal of stage 68. Potentiometer 94 varies the gain of the stage and is used to adjust the amplified signal measurement of the fluid turbidity to the proper level for achieving correct operation of the alarm. The output of stage 70 is supplied by line 96 as an input to comparator stage 72.

Comparator stage 72 comprises an integrated circuit 98, resistors 100 through 108, potentiometer 110 and capacitor 112 connected as illustrated. Resistor 100 and capacitor 112 form the connecting circuit from line 96 to one input of integrated circuit 98. Resistors 104, 106 and 108 are serially arranged with potentiometer 110 across lines 64 and 66 to provide an adjustable fraction of the DC supply voltage as a reference signal input through resistor 102 to the other input of integrated circuit 98. Comparator stage 72 develops an alarm signal at the output of integrated circuit 98 whenever the amplified turbidity output signal from stage 70 exceeds the reference signal from potentiometer 110 by a preselected amount. When potentiometer 110 is adjusted to increase the reference signal level, the sensitivity of the alarm is reduced, and vice-versa. The dashed line 114 extending from potentiometer 110 to AC circuit portion 56 schematically indicates that operation of switch elements 116 and 118 in the AC circuit portion 56 are related to the setting of potentiometer 110. Switch elements 116 and 118 provide ancillary functions by controlling respectively an on-off pilot indicator lamp 120 and an alarm bell 122. More specifically, switch 116 closes to light lamp 120 when potentiometer 110 is operated to a minimum sensitivity position. With potentiometer 110 set to this position, the alarm responds only to impurity levels which exceed a certain maximum impurity level. Because the fluid turbidity level for which an alarm signal is desired is lower than this maximum impurity level, the alarm is effectively off. Lamp 120 lights to indicate "off" status. Switch 118 assumes the position illustrated only when potentiometer 110 is adjusted to a maximum sensitivity position. With switch 118 in this position, alarm bell 122 is rendered inoperative. Customarily, potentiometer 110 is adjusted to this position only during initial adjustment of the alarm so that switch 118 prevents ringing of the bell only during setup. As will be later seen in greater detail, once the setup adjustment has been completed, potentiometer 110 is adjusted away from the maximum sensitivity position to permit bell 122 to sound an alarm whenever the turbidity level of the dialytic fluid exceeds a level corresponding to the setting of potentiometer 110. Comparator circuit 72 further includes a normally open push button switch 124 which may be operated to short circuit resistor 108. As will also be later seen, switch 124 is utilized during initial setup and adjustment.

Relay driver stage 74 comprises two resistors 126 and 128, a transistor 130, a relay 132 and a normally closed push button switch 134 connected as illustrated. The coil 136 of relay 132 is connected from the emitter of transistor 130 through switch 134 to line 64. Preferably, a suppressor diode 138 is connected across coil 136. Resistor 128 is connected from the collector of transistor 130 to line 66 and resistor 126 is connected from the output of comparator stage 72 to the base of transistor 130. Relay 132 has a first set of normally open contacts 140 connected from line 66 to the junction of the transistor emitter and coil 136. A second set of contacts 142 of relay 132 are connected in AC circuit portion 56. The normally closed circuit of contacts 142 conducts AC power via receptacle 144 to a pump (not shown) in the dialysis machine with which the turbidity alarm is used. This pump circulates blood through the blood flow circuit of the dialysis machine. Connected to the normally open circuit of contacts 142 are an alarm indicator lamp 146, switch 118 and alarm bell 122. With this arrangement, the occurrence of an alarm signal at the output of comparator 72, which indicates that the turbidity of the dialytic fluid exceeds the turbidity level corresponding to the setting of potentiometer 110, operates transistor 130 to energize relay 132. Energization of relay 132 closes contacts 140 to latch the relay and operates contacts 142. Operation of contacts 142 lights lamp 146 and sounds alarm bell 122 while disconnecting power from receptacle 144 to turn off the blood pump. The alarm is turned off by operating switch 134 to unlatch relay 132.

Operation of the turbidity alarm is as follows. With photocells 32 and 36 initially balanced by adjustment screw 40, the flow of fluid through tube 20 is continuously monitored by transducer 10 and DC circuit 58. Should the turbidity of the fluid begin to increase for any reason, for example by failure of the membrane in the dialysis machine, the photocells begin to go out of balance. The amplified turbidity output signal of stage 70 changes in accordance with the fluid turbidity level, and this changing signal is continuously compared with the reference turbidity level signal established by potentiometer 110. When the fluid turbidity level exceeds the maximum allowable turbidity level as established by the reference, relay 132 operates to shut off the blood pump and sound an alarm.

Now that the operation of the turbidity indicator and alarm of the present invention has been understood, its advantages can be more fully appreciated. First, the alarm is substantially insensitive to variations in the intensity of the light emitted from lamp 30. Any variation in lamp intensity is sensed by both measuring photocell 32 and reference photocell 36 so that the voltage at the junction 84 of the two photocells remains substantially constant in spite of variations in lamp intensity. Consequently, an erroneous alarm signal cannot be generated by such variations. Secondly, the alarm can detect outage of lamp 30 because of the drastic change in the emitter voltage of transistor 78 occasioned by the lamp going out. Thus, should the lamp fail, the alarm would sound. Thirdly, the long-term accuracy of the alarm is maintained to a high degree because reference photocell 36 compensates for long-term changes in the operating characteristics of measuring photocell 32. Preferably, both photocells 32 and 36 are of an identical type, and therefore have operating characteristics which will change in substantially the same manner as the photocells are operated. Thus, two new photocells 32 and 36 will age in substantially the same fashion over the course of operation of the turbidity alarm. Both photocells will have substantially the same voltage applied to them, receive substantially the same intensity of light, be exposed to substantially the same ambient conditions and as a result will undergo substantially similar changes in their operating characteristics in the course of their useful operating lives. Therefore, as the operating characteristics of measuring photocell 32 change, the operating characteristics of reference photocell 36 change in substantially the same fashion so that the initial balance of the two photocells is maintained for a much longer time than in prior art apparatus which utilize only a single photocell.

The setup and adjustment procedure for the turbidity alarm is as follows. Potentiometer 110 is operated to its maximum sensitivity position, and for reasons which will become apparent, switch 124 is depressed to short out resistor 108. Under these conditions, the reference signal for comparator 72, as supplied by potentiometer 110 to integrated circuit 98, assumes a certain minimum level. With a base turbidity level of dialytic fluid flowing through tube 20, adjustment screw 40 is actuated to bring the two photocells into balance. The gain of amplifier stage 70 is set to minimum by appropriate adjustment of potentiometer 94. Should relay 132 be energized, it is now de-energized by operating switch 134, (the gain of amplifier stage 70 being sufficiently low to prevent comparator stage 72 from operating relay driver stage 74 under these conditions). The gain of amplifier stage 70 is now increased by adjusting potentiometer 94 until the amplified turbidity signal measurement exceeds the reference signal level which is being supplied from potentiometer 110 by an amount just sufficient to cause integrated circuit 98 to actuate transistor 130 and energize relay 132. Thus, with this procedure, potentiometer 94 is slowly adjusted to increase the amplifier gain until lamp 146 lights. The circuit is now in adjustment. Upon release of switch 124, the circuit is ready for operation. When switch 124 is released, resistor 108 is once again electrically inserted into the series string of resistors 104, 106 and potentiometer 110. The value of resistor 108 relative to the total resistance of the series string is relatively small but is large enough so that its reinsertion slightly increases the reference signal supplied from potentiometer 110 above the minimum in the direction of reduced alarm sensitivity. Therefore, with potentiometer 110 adjusted to its maximum sensitivity position and switch 124 now released, the turbidity level of the dialytic fluid must exceed the base turbidity level by a certain amount (corresponding to the offset produced by reinsertion of resistor 108) before the alarm will sound. Adjustment of potentiometer 110 away from its maximum sensitivity position increases the degree of fluid turbidity to which the alarm is responsive and reduces the alarm sensitivity.

While the turbidity alarm of the present invention has been described in a preferred embodiment, it is contemplated that various modifications may be made to the structure of the preferred embodiment which are within the scope of the invention. For example, the several stages may be constructed in various fashions to accomplish the functions of the circuits illustrated. Of course, it is to be appreciated that the basic function of the invention is to provide a measurement of fluid turbidity which is unaffected by changes in the operating characteristics of the components and correspondingly that the functional usage to which this measurement is put depends upon the type of application in which the invention is to be used. For example, it may be desired to continuously display the fluid turbidity and in such an instance the circuit arrangement could be modified to operate devices such as chart recorders or meters. Furthermore, it is contemplated that other schemes for connecting photocells in compensating fashion may be had. While the preferred embodiment discloses the reference and measuring photocells connected in series with each other, one will recognize that the two photocells are arranged to operate in essentially a differential mode, and circuit arrangements other than the specifically illustrated arrangement are suitable for this purpose. A further point to be recognized is that in the very long run, changes in the operating characteristics of the two photocells may result in the loss of photocell balance. However, it is to be understood that the operational performance of the invention represents a substantial improvement over apparatus which utilizes only a single photocell. Specific components utilized in the preferred embodiment are set forth below, and it is to be appreciated that one skilled in the art will understand the proper assembly of such components in light of the foregoing description and drawings, in particular, the proper assembly of the integrated circuits 76, 86 and 98.

Lamp 30 — 18V–200 MA
Measuring Photocell 32 — CL 605 (Clarix)
Reference Photocell 36 — CL 605 (Clarix)
Integrated Circuits 76, 86, 98 — N2 741 (Fairchild)

Transistor 78 — 2N2102
Resistor 80 — 270 ohms, 2W
Resistor 82 — 330K
Resistors 88, 90 — 1,500 ohms
Resistor 92 — 1K
Potentiometer 94 — 10K
Resistors 100, 102 — 1K
Resistor 104 — 8.2K
Resistor 106 — 12K
Resistor 108 — 1K
Potentiometer 110 — 10K
Capacitor 112 — 10 mfd., 35V
Resistor 126 — 560 ohms
Resistor 128 — 47 ohms
Transistor 130 — 2N1304
Diode 138 — 1N5404
DC Supply Voltage — 24V

I claim:

1. In a dialysis machine in which a turbid dialytic fluid is circulated in a fluid path, a transducer for monitoring the turbidity of the circulating fluid comprising, in combination, a body housing a transparent conduit through which said turbid dialytic fluid is to flow, a light source disposed in said body in proximity to said transparent conduit, first light sensitive means disposed diametrically across said transparent conduit from said light source such that the intensity of the light incident upon said first means is a function of the turbidity of the fluid flowing through said conduit, second light sensitive means disposed in said body, means defining an aperture between said light source and said second means through which light from said source is directly incident upon said second means, means for adjusting the intensity of the light incident upon said second means through said aperture, and means for connecting said first and second light sensitive means to an electrical circuit, whereby the intensity of the light incident upon said first means through said conduit and fluid may be compared with the adjusted intensity of the light incident upon said second means.

2. In a dialysis machine, the transducer as set forth in claim 1 wherein said adjustment means comprises means progressively adjustable into said aperture to restrict said aperture thereby reducing the intensity of the light incident upon said second light sensitive means from said light source.

* * * * *